F. F. GREEN.
TIRE.
APPLICATION FILED DEC. 1, 1915.
1,247,262.
Patented Nov. 20, 1917.
2 SHEETS—SHEET 2.
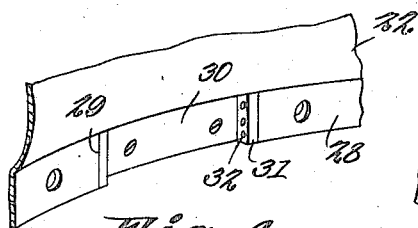
Fig. 4.
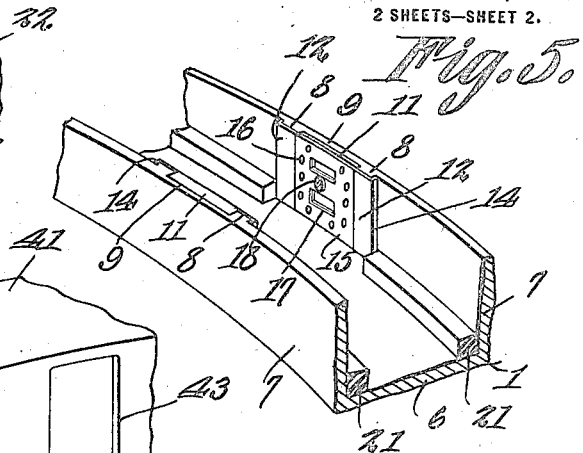
Fig. 5.
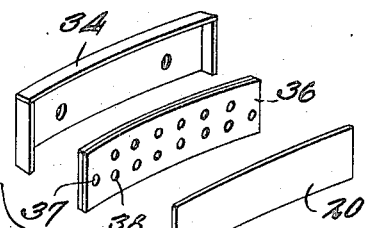
Fig. 6.
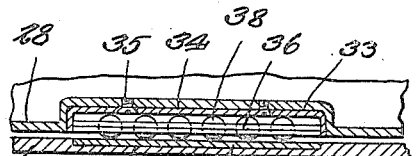
Fig. 7.
Fig. 8.
Witnesses
F. F. Green
Inventor,
by
Attorneys.

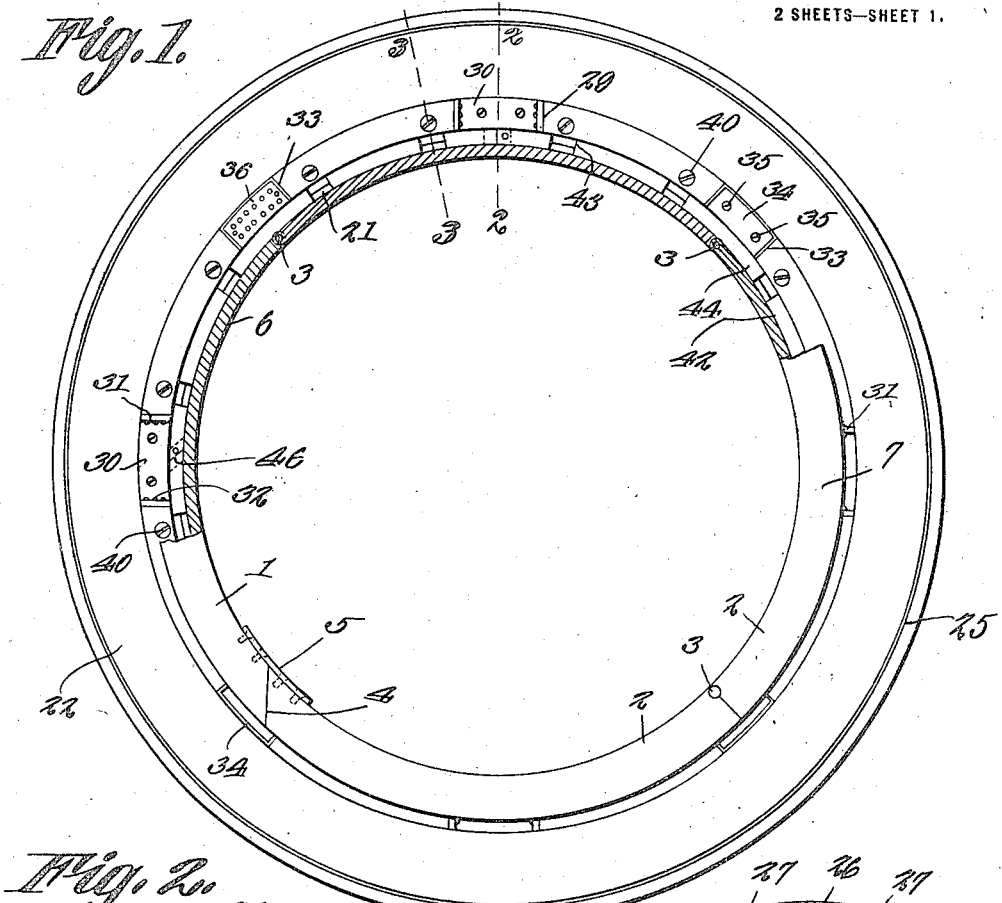
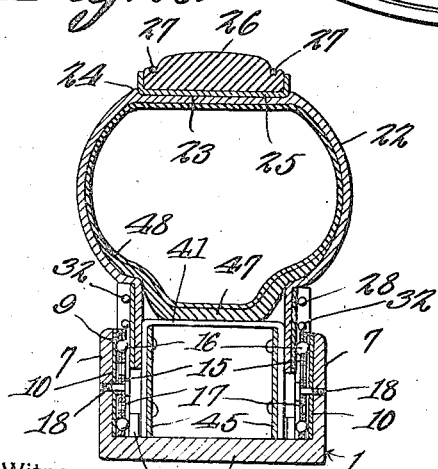
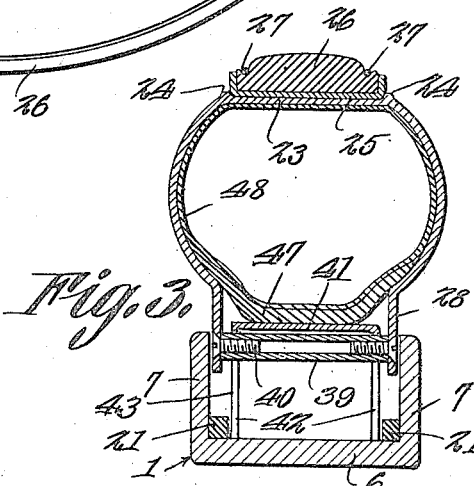
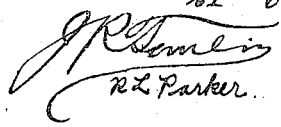

UNITED STATES PATENT OFFICE.

FURNEY F. GREEN, OF COALGATE, OKLAHOMA.

TIRE.

1,247,262.
Specification of Letters Patent.
Patented Nov. 20, 1917.

Application filed December 1, 1915. Serial No. 64,458.

*To all whom it may concern:*

Be it known that I, FURNEY F. GREEN, a citizen of the United States, residing at Coalgate, in the county of Coal and State of Oklahoma, have invented a new and useful Tire, of which the following is a specification.

The device forming the subject matter of this application is a resilient tire, and one object of the present invention is to provide a structure of this type which will not be subject to deterioration through puncture and attrition.

Specifically, the invention aims to provide novel means for housing the inner tube and protecting the same, the inner tube being made efficient as a means for affording the desired resiliency.

Another object of the invention is to provide novel means whereby the necessary movements may be permitted to take place, anti-frictionally, between the tire and the rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation, a portion of a wheel or tire embodying the present invention, parts being broken away and sectioned;

Fig. 2 is a cross section on the line 2—2 of Fig. 1;

Fig. 3 is a cross section on the line 3—3 of Fig. 1;

Fig. 4 is a fragmental perspective showing a portion of the tire;

Fig. 5 is a fragmental perspective showing a portion of the demountable rim;

Fig. 6 is a fragmental perspective showing a portion of the support;

Fig. 7 is a fragmental longitudinal section showing one of the anti-friction devices;

Fig. 8 is a composite perspective showing another of the anti-friction devices.

In carrying out the present invention there is provided a trough-shaped demountable rim 1 preferably made of metal and embodying a plurality of sections 2, certain of which are united by hinges 3, the terminal sections 2 of the rim 1 being beveled at their ends as shown at 4, to facilitate the disposing of the rim 1 in a circular form. The beveled ends 4 of the terminal sections of the rim 1 may be united by a removable plate 5, although this element may be dispensed with or changed, should occasion demand. The rim 1 embodies a base 6 and side flanges 7.

At intervals, the inner faces of the side flanges 7 are provided, as indicated in Fig. 5, with spaced, parallel ribs 8, defining a recess 9 therebetween. Fitting into the recess 9 is a back plate 10 embodying a top flange 11 and ends 12 extended across the ribs 8, the ends 12 terminating in lips 14 which bear against the side edges of the ribs 8. Coöperating with the back plate 10 is a closure plate 15 through which protrude anti-friction balls 16, the closure plate 15 being provided with openings 17 which serve to permit dirt to find its way out of the pocket defined by the closure plate 15 and the top flange 11, so that the balls 16 may run freely. The closure plate 15, ordinarily, is held in place by a securing element 18 passing through the back plate 10 and entering the side flange 7. The side flanges 7 are provided at opposed points with the anti-friction devices above described, and the pairs of antifriction devices thus set forth preferably are located 90 degrees removed from each other, the wheel thus being provided with four pairs of antifriction devices of the sort above mentioned, although more or less than four pairs may be used, if considered expedient. Alternating with the anti-friction devices above described but preferably located 90 degrees removed from each other are wear plates 20 set into and held in recesses 19 formed on the inner faces of the side flanges 7. This detail is best disclosed in Fig. 7. Extended longitudinally of the rim 1 and located in the angles defined by the flanges 7 and the base 6 are buffers 21, preferably in the form of rubber strips.

The invention comprises a tire 22 which may be made of metal, the tire 22 being preferably flattened as shown at 23, and provided adjacent its flattened portion 23 with longitudinal side ribs 24. A trough-shaped metal shoe 25 is heated and shrunk onto the flattened surface 23 of the tire 22 between the side ribs 24. Seated in the shoe 25 is a tread 26 which may be made of rubber, the tread being retained by side rings 27 or in any other suitable manner. The tire 22 includes side flanges 28 received between the side flanges 7 of the demountable rim 1, as shown best in Figs. 2 and 3. In the side flanges 28 are fashioned recesses 29 receiving plates 30 (see Fig. 4) provided at their ends with pockets 31 including balls 32. The balls 32 coact with the strips 14 shown in Fig. 5, and the balls 16 as shown in Fig. 5 coact with the plates 30, sufficient circumferential play being permitted, so that the resilient features of the wheel will in no wise be impaired. Seated in recesses 33 and in the side flanges 28 of the tire, as shown in Fig. 7, are box-like casings 34, one of which is shown in Fig. 8, the casings 34 preferably being held in place by securing elements 35. Seated in the box-like casings 34 are two-part ball retainers 36, the constituent members of which, as shown in Fig. 8, are united by securing elements 37, the ball retainers 36 carrying balls 38 adapted to coact with the wear plates 20.

Interposed between the flanges 28 of the tire 22 are tubular sleeves 39. Screws 40 are passed through the flanges 28 and are threaded into the ends of the sleeves 39. A skilled mechanic will appreciate readily that the screws 40 may be replaced by bolts, but screws, ordinarily, will be found more efficient than bolts, since, by the use of the screws, the protruding nuts on the bolts may be avoided.

The invention comprises a trough-shaped support 41, ordinarily fashioned from metal, the support 41 embodying side flanges 42, the support 41 being inverted, as shown in Fig. 3, and the inner edges of the side flanges 42 resting on the base 6 of the rim. In the side flanges 42 of the support 41 openings 43 are fashioned, these openings being adapted to receive the sleeves 39 and the screws 40 which connect opposed side flanges 28 of the tire 22, the construction being such that the necessary movement in the tire 22, parallel to the median plane of the structure, may be permitted. The trough-shaped support 41 preferably comprises a plurality of sections 44, the ends of which abut, one end of each section being provided, as shown in Fig. 6, with inset wings 45, adapted to be received between the side flanges 42 of the next section of the support. As indicated in Fig. 1, the ends of certain of the sections of the trough-shaped support 41 are beveled, to facilitate the mounting of the support in place, the beveling above alluded to being designated by the reference character 46.

Upheld by the support 41 is an annular shoe 47 of trough-shape, the shoe 47 ordinarily being made of rubber or some resilient substance of a like sort. The longitudinal edges of the shoe 47 overlap the side portions of the tire 22 as clearly shown in Fig. 2 of the drawings. Interposed between the shoe 47 and the tire 22 is a tube 48 made of rubber or some similar substance and adapted to be inflated by any suitable means, not shown, but well understood in the art.

In practical operation, the tube 48 is inserted into the tire 22, the sleeves 39 being removed. The shoe 47 is then mounted in place, the support 41 is inserted, the rim 1 is disposed in annular form, as shown in Figs. 1 and 3, the sleeves 39 having been previously mounted in place between the flanges 28 of the tire 22.

When the parts are set up as above described, the tube 48 will afford the necessary resiliency, and permit the tire 22 to move radially of the wheel, with respect to the demountable rim 1, the anti-friction devices above described being so constructed that, although the necessary movement radially between the tire 22 and the rim 1 may be permitted, excessive creeping will at the same time, be avoided.

Having thus described the invention, what is claimed is:—

1. In a device of the class described, a rim embodying a base and side flanges; spaced resilient cushioning strips lodged in the angles defined by the side flanges and the base; a trough-shaped support inverted on the rim and engaging the rim between the cushioning strips, the support being provided with lateral openings; a tire embodying flanges slidably received between the flanges of the rim and the support and adapted to coact with the cushioning strips; securing devices connecting the flanges of the tire and received in the openings of the support; and a cushion interposed between the support and the tread portion of the tire.

2. In a device of the class described, a rim including a base and side flanges; a tire having side flanges disposed between the side flanges of the rim, one side flange of the rim and one side flange of the tire constituting coöperating elements, one of said coöperating elements having a lateral recess; anti-friction devices located at the ends of the recess; a casing projecting from the other of said coöperating elements and entering the recess to limit relative circumferential creeping between the rim and the tire, the anti-friction devices coacting with the ends of the casing; and anti-friction devices carried by the casing and coacting with that coöperating element which is provided with the recess, at the base of the recess.

3. In a device of the class described, a rim including a base and side flanges, one of the side flanges being provided with ribs; a casing disposed between the ribs; a tire including side flanges disposed between the side flanges of the rim, one of the side flanges of the tire being provided with a recess in which the ribs are received, to prevent the creeping between the tire and the rim; anti-friction devices carried by said flange of the tire and located at the ends of the recess, the anti-friction devices coacting with the outer edges of the ribs; and anti-friction devices carried by the casing, the last specified anti-friction devices coöperating with the said flange of the tire at the base of the recess.

In testimony that I claim the foregoing as my own, I have hereto affixed my signature in the presence of two witnesses.

FURNEY F. GREEN.

Witnesses:
 IVY E. SIMPSON,
 PHILOMENA A. ROCKELLI.

Copies of this patent may be obtained for five cents each, by addressing the "Commissioner of Patents, Washington, D. C."